US006338250B1

(12) United States Patent
Mackay

(10) Patent No.: US 6,338,250 B1
(45) Date of Patent: Jan. 15, 2002

(54) TURBOCHARGER SYSTEM

(75) Inventor: Stewart Alexander Mackay, Near Kington (GB)

(73) Assignee: Rolls-Royce & Bentley Motor Cars Limited, Cheshire (GB)

( * ) Notice: Subject to any disclaimer, the term of this patent is extended or adjusted under 35 U.S.C. 154(b) by 0 days.

(21) Appl. No.: 09/582,968

(22) PCT Filed: Jan. 7, 1999

(86) PCT No.: PCT/GB99/00006

§ 371 Date: Sep. 5, 2000

§ 102(e) Date: Sep. 5, 2000

(87) PCT Pub. No.: WO99/35380

PCT Pub. Date: Jul. 15, 1999

(30) Foreign Application Priority Data

Jan. 8, 1998 (GB) ............................................. 9800282

(51) Int. Cl.$^7$ ................................................ F02B 33/44
(52) U.S. Cl. ........................... 60/612; 60/602; 123/562; 123/564
(58) Field of Search ................... 60/612, 602; 123/562, 123/564

(56) References Cited

U.S. PATENT DOCUMENTS

| 4,594,668 | A | * | 6/1986 | Fujawa et al. | ............... 123/564 |
| 4,669,269 | A | | 6/1987 | Dinger et al. | ................. 60/612 |
| 4,781,027 | A | | 11/1988 | Eger et al. | ..................... 60/612 |
| 5,090,204 | A | * | 2/1992 | Bonitz et al. | .................. 60/612 |
| 5,488,827 | A | * | 2/1996 | Helmich et al. | .............. 60/612 |
| 5,845,495 | A | * | 12/1998 | Schray et al. | ................. 60/612 |
| 6,050,250 | A | * | 4/2000 | Kerkau | ........................ 60/602 |

FOREIGN PATENT DOCUMENTS

| EP | 492272 | 7/1992 |
| EP | 728922 | 8/1996 |

* cited by examiner

Primary Examiner—Thomas Denion
Assistant Examiner—Thai-Ba Trieu
(74) Attorney, Agent, or Firm—Pillsbury Winthrop LLP

(57) ABSTRACT

A turbocharger system for an internal combustion engine comprises two turbochargers each having a turbine (5, 6) drivably connected to a compressor (7, 8). Temperature sensors (19, 20) are disposed to sense the temperature at the compressor outputs. The temperature are monitored to give an indication of an imbalance condition for which corrective action may be taken. The arrangement provides for reliable and inexpensive monitoring.

9 Claims, 4 Drawing Sheets

TURBOCHARGER SYSTEM

Figure 1:
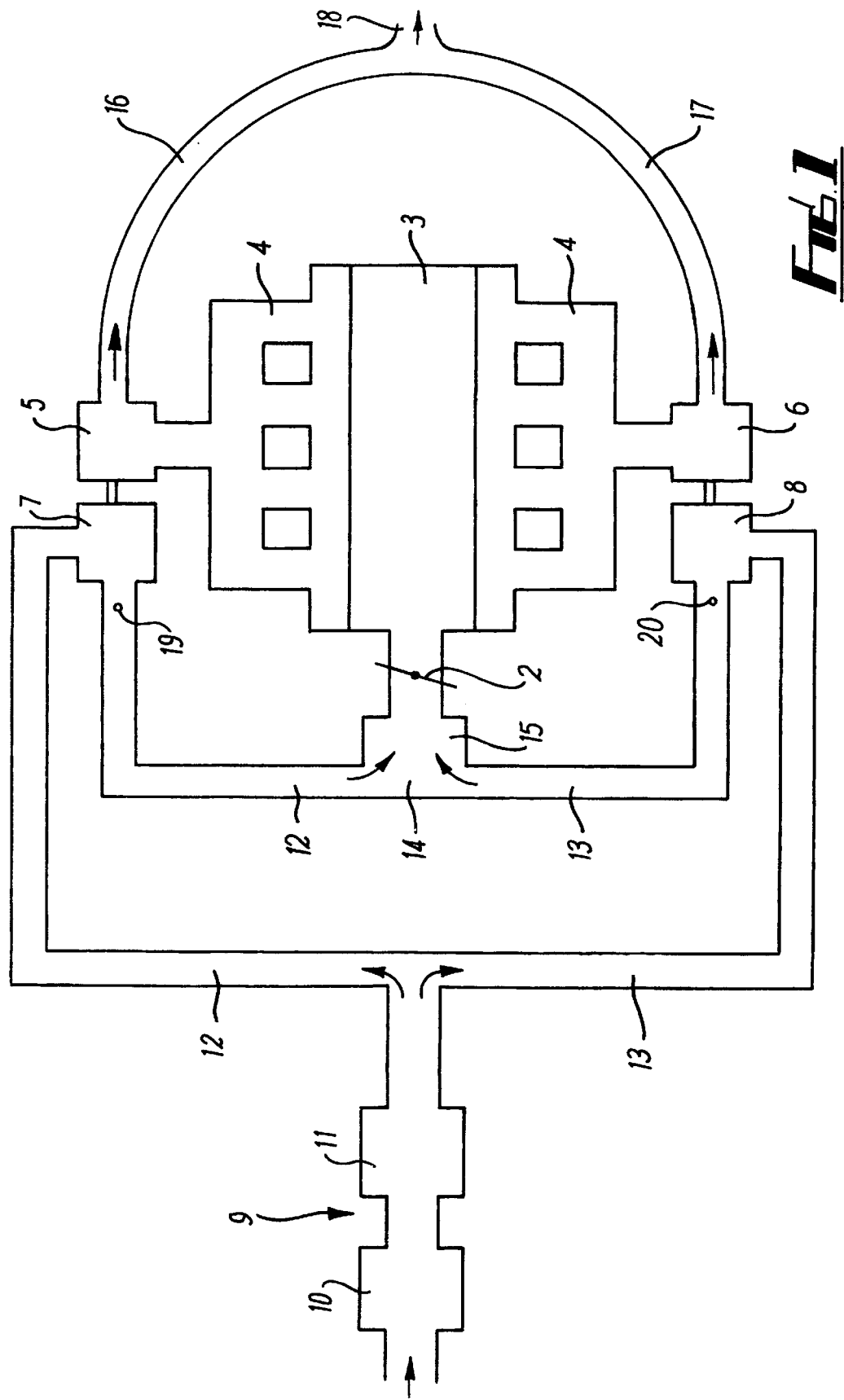

The present invention relates to a turbocharger system.

It is typical for a turbocharged engine to be controlled by an electronic engine management system, using manifold pressure or air mass flow rate as a control variable. With this technology, it would be normal for the turbocharger wastegate to react, such that a desired air mass flow rate or manifold pressure is achieved. The desired rate will depend upon such parameters as engine speed and throttle position.

With a twin-turbocharged engine application, it is typical for a similar control system to be applied. Under normal conditions the turbocharger wastegate positions react in parallel, such that each turbocharger operates with half the total air mass flow rate passing through each.

In the event of a failure, perhaps in the wastegate actuator for example, such that the two turbochargers do not react in parallel, it is necessary for the engine management system to be alerted via self-diagnosis. The engine management system can then activate a fail-safe operating condition (limp-home). If this is not done, the turbocharger carrying the greater air mass flow rate can overspeed, leading to catastrophic failure.

It is not normally possible for the turbocharger speeds to be measured directly.

It is known that it may be possible to diagnose asynchronous turbocharger operation by careful measurement of pressures, either before the turbochorger compressor, or directly after the turbocharger compressor. However, this may be difficult and expensive to achieve. Since it is usual for the two compressor outlets to be connected together before entering a common inlet manifold, the pressures are largely held together, even if the air low rate through one compressor is almost nil. Pressure differentials are small, the detection of which requires high tolerance (expensive) transducers. Under this condition however, the compressor with the higher air flow rate does produce a slightly higher pressure.

According to one aspect of the present invention, there is provided a turbocharger system for use with an internal combustion engine comprising two turbochargers each having a turbine drivably connected to a compressor and temperature sensor means associated with the compressors to enable an imbalance between the two turbochargers to be sensed.

According to another aspect of the present invention, there is provided a method of operating a turbocharger system for an internal combustion engine comprising two turbochargers each having a turbine drivably connected to a compressor including the steps of monitoring the temperature at or adjacent each compressor and comparing the temperature monitored to give an indication of an imbalance condition between the two compressors.

In a preferred embodiment of the invention, the sensor means comprise thermocouples or other temperature sensing elements advantageously disposed at respective outlets of the two compressors. These elements produce electrical signals which enable the temperatures at the compressor outlets to be compared. The signals may be compared in a normal comparator circuit which may or may not form part of the engine management system of the engine to which the turbocharger system is to be fixed. Engine management systems usually incorporate a microprocessor which provides a signal processing function which may be used to process the signal to give an imbalance indication. Where an imbalance condition occurs, the harder working compressor outlet temperature will rise. In addition, because the new compressor operating condition will not be as efficient as the optimum (balanced) compressor condition, there will be a further temperature increase. The temperature difference between the air condition at the two compressor outlets, is sufficient such that it can be measured using inexpensive and reliable thermocouples. In addition, the resolution of imbalance is very much better than that which could be determined by using pressure measurements.

Figure 2:
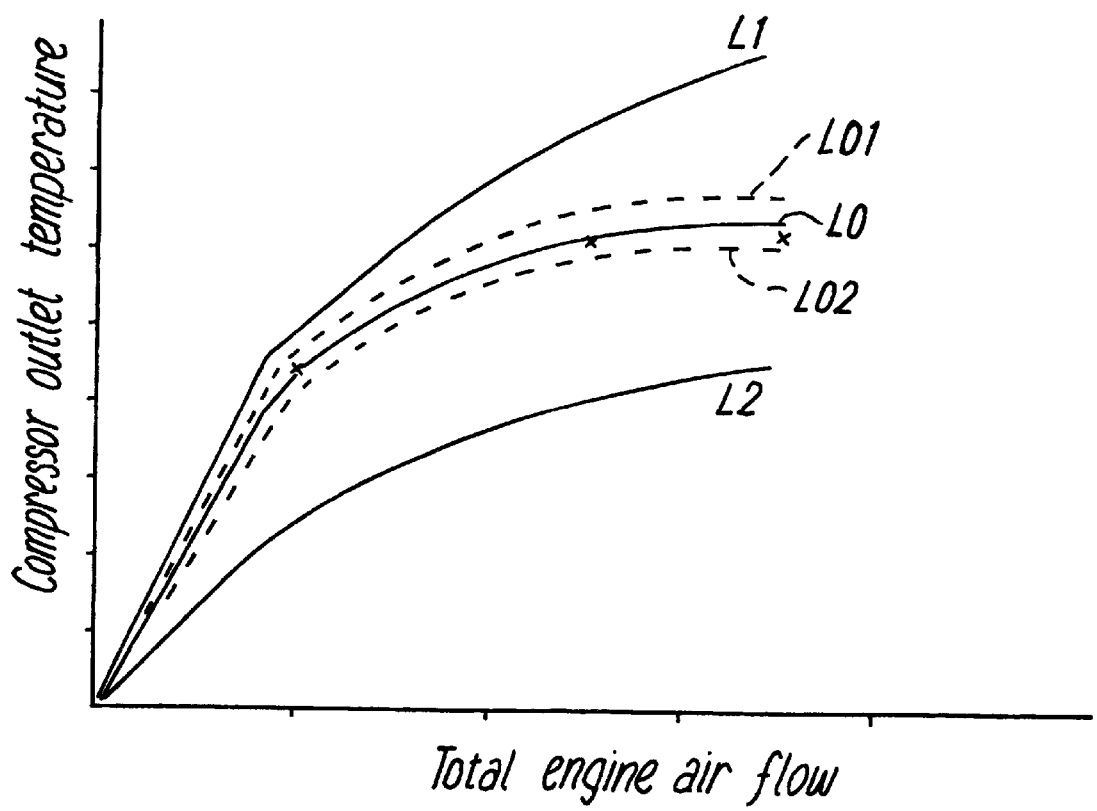
Figure 3:
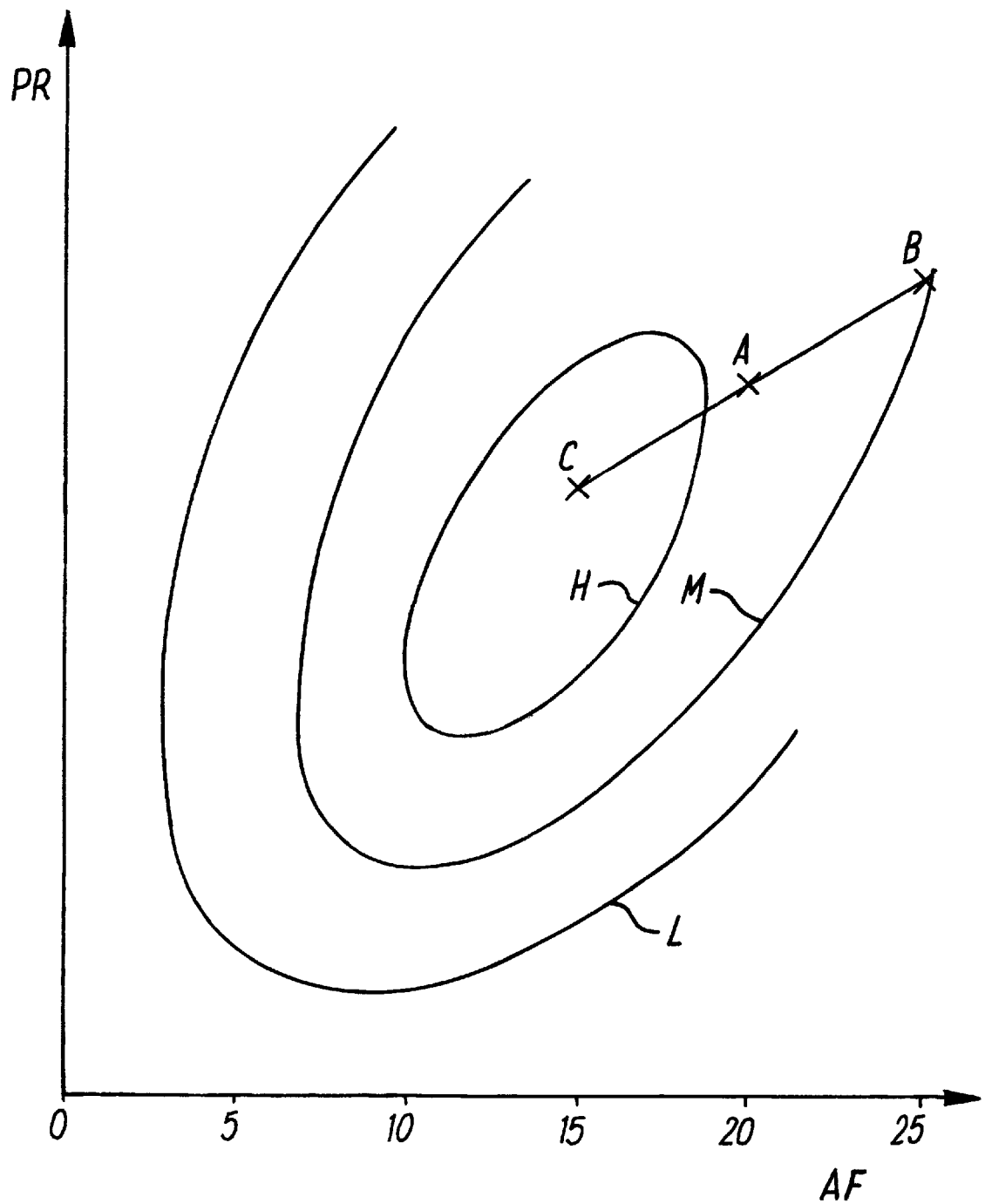
Figure 4:
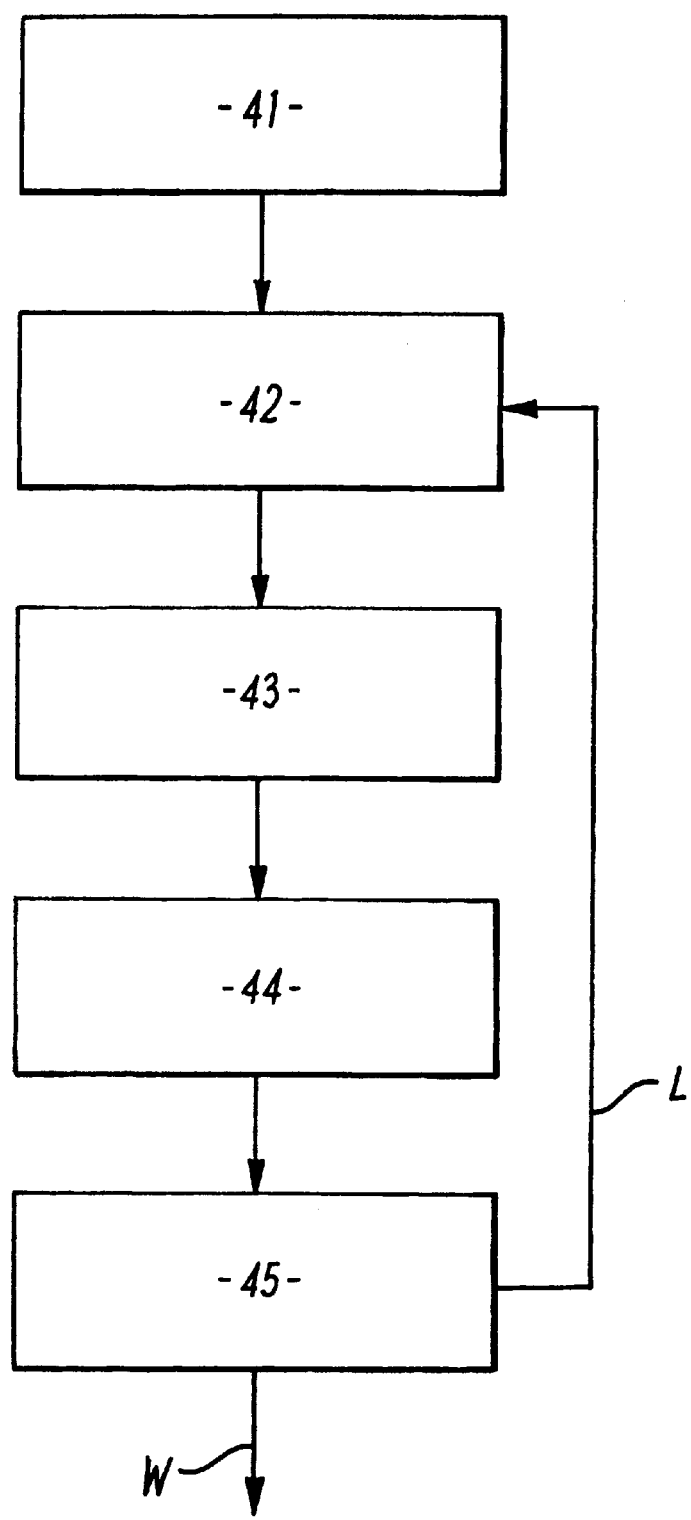

In order that the invention may be more clearly understood, one embodiment thereof may now be described, by way of example, with reference to the accompanying drawings, in which:

FIG. 1 diagrammatically shows a turbocharger system according to the invention,

FIG. 2 shows a graph of compressor outlet temperature plotted against air flow for the system of FIG. 1, FIG. 3 shows a graph of pressure ratio plotted against air flow for the compressors of the system of FIG. 1, and FIG. 4 is a control air flow chart.

Referring to FIG. 1, the turbocharger system is connected to an internal combustion engine comprising an air intake 1 leading via a throttle 2 to an inlet manifold 3 and twin exhaust manifolds 4. The twin exhaust manifolds are connected to respective turbines 5 and 6 of respective turbochargers. Turbines 5 and 6 are drivably connected to respective compressors 7 and 8 of the respective turbochargers. An engine airflow input path 9 leads via an air filter 10 to an air flow rate measurement device 11 after which it divides into two branch ducts 12 and 13. The two above mentioned compressors 7 and 8 are disposed in respective branch ducts 12 and 13. These branch ducts merge at 14 upstream of a chargecooler 15 and throttle 2. Exhaust ducts 16 and 17 lead from respective turbines 5 and 6 and merge at 18 leading thereafter to exhaust.

Two temperature sensors 19 and 20 such as thermocouples are respectively disposed adjacent the two compressors 7 and 8 on the downstream side thereof. These sensors 19 and 20 are operative to sense the temperature at the outputs of the compressors 7 and 8. Exemplary plots of compressor outlet temperatures sensed by the sensors 19 and 20 against total engine air flow are shown in FIG. 2. Where both turbochargers are operating normally under balanced operating conditions, the temperatures sensed by both sensors 19 and 20 should ideally be the same. This ideal position is represented by line LO on FIG. 1. The two dotted lines LO1 and LO2 on opposite sides respectively of line LO indicate an acceptable area of differing temperature between the two compressor outputs resulting from trim balancing between respective turbocharger wastegate actuators to improve balance. In other words limited temperature differences between compresssor outputs can be accepted, if this is necessary to improve balanced conditions in other respects. Full lines L1 and L2 also on opposite side respectively of but further displaced from line LO indicate the two compressor output temperatures when an unacceptable imbalance condition and therefore temperature differential has occurred. Line L1 indicates the temperature of the compressor which is working very hard and line L2 indicates the temperature of the compressor which is doing very little work. In this imbalanced state the total engine air is considered correct but the individual flow rates through the two compressors are not the same.

A conventional way of graphically representing the operation of a turbocharger system such as described above is by ploting pressure ratio PR against airflow AF through each compressor. This graph is shown in FIG. 3, and an balance condition can also be represented on this graph.

High medium and low turbocharger efficiency contours respectively referenced H, M and L are as shown on this graph. The pressure ratio is defined as the compressor outlet pressure divided by the compressor inlet pressure. On a twin turbocharger engine installation, each compressor is usually designed to operate under the same conditions.

Consider an operating point A where each (balanced) compressor operates with an air flow of 20. Consider now an imbalance where one now operates at 25, (point B) the other at 15 (point C). (The total remains the same and is subject to an overall engine feedback control).

The unit with the higher air flow will have a higher pressure drop between the compressor outlet and the inlet manifold. The compressor pressure ratio therefore increases somewhat. The unit with the lower air flow has a correspondingly lower pressure drop across.

For the unit with the higher mass flow, the higher air flow rate and the decreasing compressor efficiency both cause the temperature to increase. The effect of higher air flow rate is shown in line L1 in FIG. 2. Different efficiency contours we shown in FIG. 3, point B being adjacent lower efficiency contour M. The unit with the lower mass flow results in a lower compressor outlet temperature and a higher efficiency. This is shown in line L2 in FIG. 2 and in FIG. 3 where point A is adjacent a higher efficiency contour H.

The operation of the system is shown in the flowchart of FIG. 4, which comprises five steps respectively referenced 41 to 45. The first two steps 41 and 42 relate to conventional overall engine feedback and the last three steps to feedback control of a wastegate balance routine and diagnostics according to the invention. In step 41 the set point map of the engine management system showing total air flow rate dependency on engine speed and throttle opening is consulted. In step 42 total air flow rate is checked against set point value and coarse wastegate positions are adjusted to achieve (nominal) set point airflow values. In step 43, the temperature at the outlets of the two compressors is monitored by sensors 19 and 20. In step 44, fine balance adjustment in individual wastegate control for the two turbochargers is determined. If the adjustment is within pre-calibrated limits corrective action may be taken via control feedback loop L to adjust wastegate positions appropriately. In this mode, the system is performing a normal monitoring and control function. If this fine adjustment is out of calibrated limits an engine failure is indicated. Driver warning and fail-safe engine operation condition including opening the wastegates is triggered via output W.

It will be appreciated that the above embodiment has been described by way of example only and that many variations are possible without departing from the scope of the invention. For example, whilst overall air mass control is shown a single air meter 11 such control could be achieved by other means, for example, inlet manifold pressure feedback control.

What is claimed is:

1. A turbocharger system for use with an internal combustion engine comprising:
    two turbochargers each having a turbine connected to drive a respective compressor;
    temperature sensors respectively associated with each of the compressors to enable an imbalance between the two turbochargers to be sensed, and further comprising means for comparing signals from each temperature sensor to enable temperatures at the compressor outlets to be compared.

2. The turbocharger system as claimed in claim 1, wherein the temperature sensors comprise thermocouples.

3. The turbocharger system as claimed in claim 1, wherein the means for comparing signals comprises a comparator circuit.

4. The turbocharger system as claimed in claim 3, wherein the comparator circuit forms part of an engine management system.

5. The turbocharger system as claimed in claim 1, wherein a microprocessor is provided to process the signal from the means for comparing to give an imbalance indication.

6. An internal combustion engine comprising a turbocharger system as claimed in claim 1.

7. The internal combustion engine as claimed in claim 6, wherein the internal combustion engine comprises twin exhaust manifolds connected to respective turbines of respective turbochargers.

8. A method of operating a turbocharger system for an internal combustion engine comprising two turbochargers each having a turbine connected to drive a compressor, including monitoring the temperature at or adjacent to each compressor, converting the temperature monitored into electrical signals and comparing the temperatures monitored to give an indication of an imbalance condition between the two compressors.

9. The method of operating a turbocharger system as claimed in claim 8, wherein the electrical signals are processed to give a turbocharger imbalance indication.

* * * * *

UNITED STATES PATENT AND TRADEMARK OFFICE
CERTIFICATE OF CORRECTION

PATENT NO. : 6,338,250 B1
DATED : January 15, 2002
INVENTOR(S) : Mackay

It is certified that error appears in the above-identified patent and that said Letters Patent is hereby corrected as shown below:

<u>Column 2,</u>
Line 21, change "1" to -- 14 --; and
Line 31, after "at" insert -- intake --.

Signed and Sealed this

Twelfth Day of November, 2002

*Attest:*

JAMES E. ROGAN
*Attesting Officer*   *Director of the United States Patent and Trademark Office*